(12) United States Patent
Loeffler

(10) Patent No.: US 6,280,384 B1
(45) Date of Patent: Aug. 28, 2001

(54) INTRACORPOREALLY INTRODUCIBLE SUSPENSION OF FERROMAGNETIC PARTICLES AND METHOD USING SAME FOR SPATIALLY RESOLVED BODY TEMPERATURE MONITORING

(75) Inventor: Ralf Loeffler, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/292,611

(22) Filed: Apr. 15, 1999

(30) Foreign Application Priority Data

Apr. 16, 1998 (DE) .............................................. 198 16 917

(51) Int. Cl.[7] .................................................. A61B 5/055
(52) U.S. Cl. ............................................ 600/412; 424/9.3
(58) Field of Search ..................... 600/410, 412, 600/420, 549; 424/9.3, 9.32, 9.323, 9.36, 9.34, 9.35, 9.322, 9.321

(56) References Cited

U.S. PATENT DOCUMENTS

| | | | |
|---|---|---|---|
| 4,558,279 | * 12/1985 | Ackerman et al. | 324/315 |
| 5,263,482 | * 11/1993 | Leunbach | 600/412 |
| 5,284,144 | * 2/1994 | Delannoy et al. | 600/411 |
| 5,492,122 | * 2/1996 | Button et al. | 600/411 |
| 5,512,268 | * 4/1996 | Grinstaff et al. | 424/9.322 |
| 5,614,652 | * 3/1997 | Filler et al. | 556/136 |
| 5,688,486 | * 11/1997 | Watson et al. | 424/9.36 |
| 5,706,810 | * 1/1998 | Rubinsky et al. | 600/410 |
| 5,720,939 | * 2/1998 | Schroder | 424/9.322 |
| 5,747,000 | * 5/1998 | Platzek et al. | 424/9.363 |
| 5,753,207 | * 5/1998 | Zuo et al. | 424/9.36 |
| 6,099,457 | * 8/2000 | Good | 600/8 |

FOREIGN PATENT DOCUMENTS

| | | |
|---|---|---|
| OS 31 40 496 | 8/1982 | (DE) . |
| 2 532 751 | 3/1984 | (FR) . |

* cited by examiner

Primary Examiner—Brian L. Casler
(74) Attorney, Agent, or Firm—Schiff Hardin & Waite

(57) ABSTRACT

In a method for spatially resolved temperature monitoring in an examination subject, a suspension of ferromagnetic microparticles is intracorporeally introduced into the body Curie temperature of which substance corresponds to a desired temperature limit value. By means of an MR measurement, a spatially resolved representation of the body is obtained with artifacts that are caused by the substance being in the ferromagnetic state being employed as a criterion for determining that the temperature limit value has not yet been reached.

8 Claims, 1 Drawing Sheet

INTRACORPOREALLY INTRODUCIBLE SUSPENSION OF FERROMAGNETIC PARTICLES AND METHOD USING SAME FOR SPATIALLY RESOLVED BODY TEMPERATURE MONITORING

BACKGROUND OF THE INVENTION

1. Field of the Invention

The present invention is directed to a method for spatially resolved temperature monitoring in a living examination subject, as well as to a suspension of ferromagnetic microparticles usable in the method.

2. Description of the Prior Art

In the field of medicine, it is necessary to detect the temperature in a living organism as precisely as possible in a spatially resolved manner. This is true for hyperthermia treatment, for example. Treatments with hyperthermia are conducted with LITT (Laser Induced Thermotherapy) or with regionally deep hyperthermia, for example, the latter method being used to treat tumors located deep in the body with HF radiation.

Particularly in hyperthermia, the temperature measurement must be highly accurate. It must be guaranteed that the tumor tissue is heated sufficiently intensely in order for the treatment to be effective, but burning of the patient (surrounding tissue) must be precluded. The temperature in the treated region must thus be kept within narrow limits, about 42.5° C. for hyperthermia, for example. This temperature is the same in all experiments, so that temperature detection need only be exact in this region.

With current methods, the temperature in the body can only be determined at individual points or along a hollow catheter. This is unsatisfactory for the above purpose, however, since a maintenance of the desired temperature over the entire treatment region cannot be guaranteed in this manner.

There are known applications of MR imaging for obtaining the temperature in the interior of a body in a spatially resolved manner. To the extent that these methods are based on proton nuclear spin resonance, the following parameters have been relevant references for the tissue temperature: chemical shift of the water peak, the T1 relaxation time of the protons, the total magnetization of the water, and the diffusion coefficient of water protons in the tissue. A non-invasive and spatially resolved monitoring of the body temperature is also possible at points far from the surface. Larger regions of the body can be simultaneously monitored. Nevertheless, these kinds of methods are not exact enough for the aforementioned purpose and are often too sensitive to external disturbances.

In the articles "Encapsulated Liquid Crystals as Probes for Remote Thermometry," (Franklin, K. J. et al; *International Journal Hyperthermia;* Vol 8(2); 1992:253–262) and "Sonochemically Produced Fluorocarbon Micropsheres: A New Class of Magnetic Resonance Imaging Agent," (*Journal of Magnetic Resonance;* 6, 1996:675–683), it is suggested that the phase transition of crystals be employed for thermometry by means of magnetic resonance. It has been established that certain substances have a considerably lower intensity of the MR signal in the solid phase than in the liquid phase. In the latter reference, a fluorocarbon-hydrocarbon mixture is suggested, which mixture changes from the solid phase into the liquid phase at a specific temperature. When this mixture is introduced into a body, it can be determined by the differences in the signal intensity of the allocated MR signal whether the prescribed temperature is exceeded. Liquid crystals were suggested in the first reference for a similar effect. In order to prevent the employed substances from being metabolized by the body and acting toxically, it is provided that these substances are enclosed in a non-toxic encapsulation which is not dissolved in the body (i.e. a body-inert encapsulation).

A common feature of all the above methods for temperature monitoring by means of MR on the basis of changes of the signal intensity in the phase transition is that a nuclear resonance measurement must be conducted with respect to this substance, e.g. fluorine. While this does not pose a problem in MR spectrometers, imaging MR devices are available practically only for proton resonance. In addition, fluorine, for instance, is present in the body only in very low concentrations, so that the body tissue could be imaged only with an extremely low signal-noise ratio. Imaging of the body tissue is a necessity for the localization of the temperature monitoring in the tissue. The above methods could be carried out, if at all, only with devices which are constructed specifically for this purpose, so that these methods are only of academic interest, at least at the present time.

SUMMARY OF THE INVENTION

It is an object of the invention to provide a method with which an accurate and reliable localized temperature monitoring is possible.

The above object is achieved in accordance with the principles of the present invention in a method for spatially resolved temperature measuring in a living body including the steps of intracorporeally introducing a ferromagnetic substance into the body, the substance having a Curie temperature which corresponds to a desired temperature limit value, and obtaining a spatially resolved representation of the body by obtaining magnetic resonance data from the body and forming an image of the body from the data, the image containing artifacts caused by the substance being in the ferromagnetic state, and using these artifacts as a criterion for determining that the temperature limit value has not yet been reached.

If the MR measurement is related to protons, conventional MR imaging devices can be employed, which ordinarily function by means of nuclear spin resonance of protons. The ferromagnetic substance can be intracorporally introduced in the form of an implant or as an injectable suspension on encapsulated ferromagnetic microparticies.

Another object of the Invention is to provide a contrast agent which is suitable for monitoring temperature by means of the effect of magnetic resonance, and the utilization of such a substance for that purpose.

This object is achieved in accordance with the principles of the present invention in a suspension of firm magnetic microparticles which have a Curie temperature in a range between an overcooled body temperature and an overheated body temperature of a living examination subject, the microparticles being encapsulated so as to be inert to metabolization by the living body.

DESCRIPTION OF THE PREFERRED EMBODIMENTS

Figure 1:
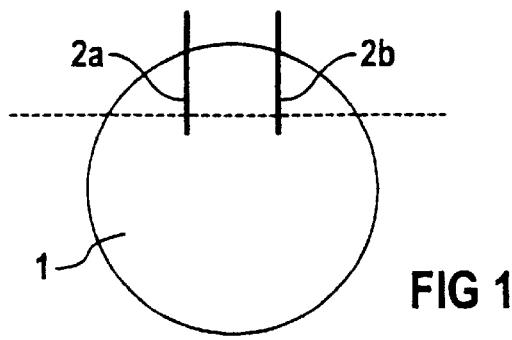
FIG. 1 illustrates the placement of ferromagnetic needles in an examination subject in accordance with the inventive method.

The Invention exploits the fact that ferromagnetic substances cause sharp (and normally unwanted) disturbances, known as artifacts, in MR images. The type and size of the disturbances depend very much on the imaging sequence used. For example, spin echo sequences are typically considerably less sensitive to magnetic field disturbances than gradient echo sequences. An example of such a gradient echo sequence is known as the FLASH sequence, as described in U.S. Pat. No. 4,707,658.

When a ferromagnetic substance is introduced into the examination region, given certain data production sequences the nuclear resonance signal is completely extinguished from the environment of this substance by dephasing; i.e., this signal is rendered dark in the MR image. By contrast, paramagnetic substances hardly influence the nuclear resonance signal in the environment; i.e., they hardly generate any artefacts.

Another physical effect is important for the inventive method and suspension namely the fact that ferromagnetic substances retain their ferromagnetic character only up to a specific temperature, namely the Curie temperature. Above this temperature, the substances are paramagnetic. There are substances which change from the ferromagnetic state into the paramagnetic state at temperatures in the region of the body temperature. The Curie temperature of these substances can be set quite precisely; furthermore, such substances are already used in medicine, and so their application in humans is no cause for concern.

The two abovementioned physical effects are used for temperature monitoring as follows: When a small amount of a ferromagnetic substance with a known Curie temperature is introduced into the examined body, the sharp field distortions which occur as long as the temperature of the substance is below the Curie temperature lead to clearly visible extinguishing of the MR signal in the environment of the substance. If the temperature in the region of this substance rises above the Curie temperature, then extinguishing of the signal no longer occurs, so that regions with a temperature well above the Curie temperature can be easily identified.

It is important here that, in contrast to known methods of temperature monitoring with substances that are introduced into the body, nuclear resonance signals are not acquired from these substances themselves, but from the surrounding tissue. A conventional nuclear spin tomography device can thus be utilized, which typically functions based on the nuclear resonance of protons. Several advantages are achieved by this indirect type of measurement:

A first advantage is that according to the pulse sequence applied, a contrast change occurs in a region of greater or lesser size around the substance introduced, even small amounts of contrast agent can lead to a clear contrast change. The demonstrated effect is not a contrast change of the substance introduced per se, but results from this substance's influence on its environment. In known methods of temperature monitoring, large substance volumes must be introduced into the body in order to produce an effect. Contrast generation by influencing the environment is already employed in MR tomography using static contrast agents in the form of ferromagnetic microparticles. Nevertheless, with these static contrast agents, a transition from the ferromagnetic state to the paramagnetic state is not exploited, since the Curie temperature of such contrast agents is far above the range of body temperatures.

Another advantage is that because the image creation is based on the nuclear resonance signals of protons, conventional nuclear tomography devices can be used.

Moreover, since the imaging is based on the protons most often present in the body, a good signal-noise ratio is obtained, so that an MR image with a good spatial resolution, comparable to that of known techniques, can be utilized.

A further advantage is that as explained above, pulse sequences are variably sensitive to magnetic field disturbances. Particularly fast impulse sequences demonstrate a high artefact susceptibility to magnetic field disturbances. In the present case, however, such artefacts are desirable, so that very fast pulse sequences can be employed. This enables three-dimensional thermometry, for example.

Figure 2:
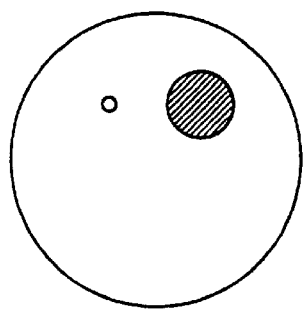
FIG. 2 shows an MR image obtained in accordance with the inventive method.

The substance with the desired Curie temperature can be implanted into the target volume in the form of small needles, for example. This is schematically depicted in FIG. 1, wherein two needles 2a and 2b are inserted into an examination subject 1. FIG. 2 schematically depicts an MR image in a sectional plane (slice) according to the dashed line in the FIG. 1.

In the illustrated case, the Curie temperature is exceeded in the region of the needle 2a, while the temperature in the region of the needle 2b is below the Curie temperature. Signal extinguishing thus occurs in the region of the needle 2b, which is not the case in the region of the needle 2a. Instead of implantable structures, a suspension of ferromagnetic microparticles can be used, such as magnetic liquids which are also employed as conventional MR contrast agents. It is thus possible to rather easily identify even the smallest regions in which the target temperature is exceeded. As is typical with contrast agents, the particles are embedded in an encapsulation which make the suspension physically tolerable.

Figure 3:
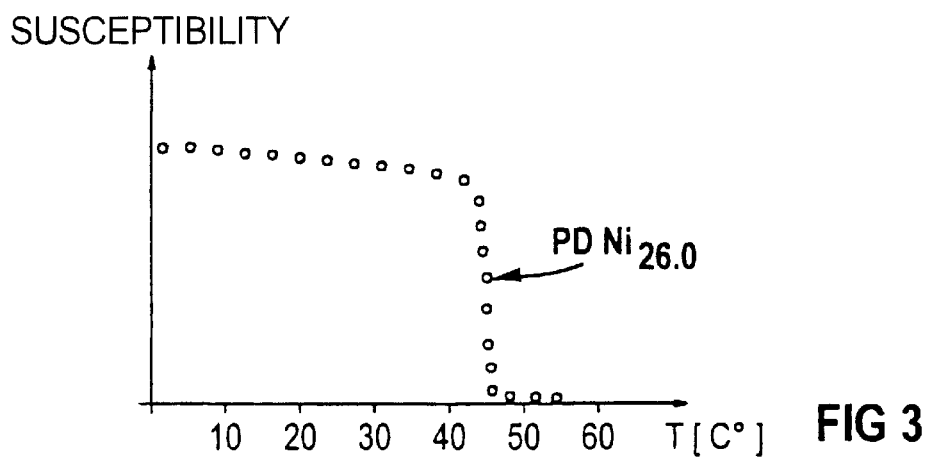
FIGS. 3 and 4 respective show the susceptibility curves of two palladium-nickel alloys suitable for use in accordance with the inventive method.
Figure 4:
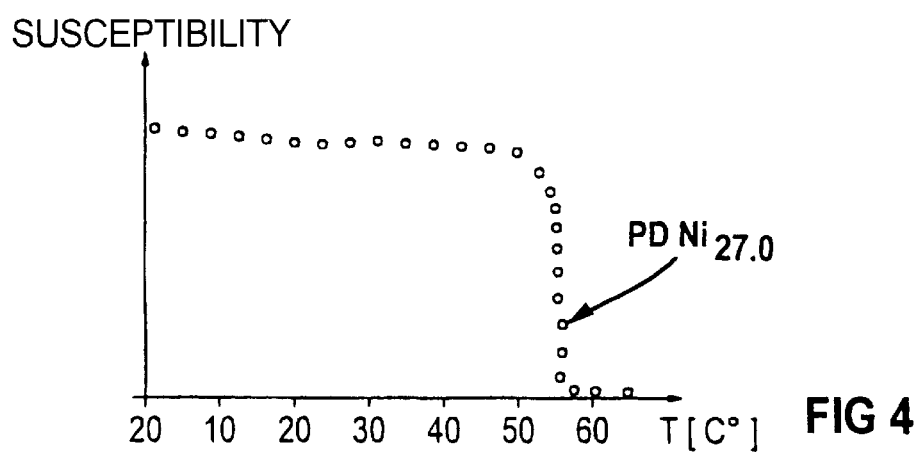

A palladium-nickel alloy is one ferromagnetic substance with a suitable Curie temperature in the range of body temperatures, for example. FIGS. 3 and 4 show the susceptibility curve of such an alloy dependent on the temperature, given an atomic nickel content of 26% and 27%, respectively. As can be seen, the desired Curie temperature can be adjusted quite well by means of the nickel content and can thus be adjusted to the desired monitoring temperature. The susceptibility curve of the palladium-nickel alloy, and its clinical application in the form of needles for hyperthermia treatment, is taught by the dissertation papers of Niek van Wieringen (University of Amsterdam, Jun. $26^{th}$, 1997). The palladium-nickel alloy is described therein as being for achieving a "self-interrupting heating" in tumor tissue. Palladium-nickel needles are inductively heated in tumor tissue by means of high frequency as long as they are ferromagnetic. As soon as the Curie temperature of the needles is exceeded, these become non-magnetic and no longer heat. In general, the Curie temperature of these needles is set at about 55° C.

With a ferromagnetic substance with a suitable Curie temperature, it is possible to carry out a temperature monitoring using conventional MR devices. This monitoring is reliable and accurate, since the transition from the ferromagnetic state into the paramagnetic state is precisely defined and clearly visible in the image. On the basis of the MR measurement, there is an excellent spatial resolution, and temperature monitoring is possible even deep in the body. The method is thus suitable for temperature monitoring in hyperthermia treatment.

Although the present invention has been described with reference to a specific embodiment, those of skill in the art will recognize that changes may be made thereto without departing from the scope and spirit of the invention as set forth in the appended claims.

I claim as my invention:

1. A method for spatially resolved temperature monitoring in a living body, comprising the steps of:
   providing a ferromagnetic substance having a Curie temperature corresponding to a predetermined body temperature limit value;
   intracorporeally introducing said substance into a living body;
   obtaining magnetic resonance data from said living body with said substance intracorporeally introduced therein;
   producing an image of said living body from said magnetic resonance data, said image containing artifacts due to said substance as long as said Curie temperature is not reached; and
   determining, from a presence of said artifacts in said image, that said body temperature limit value has not been reached.

2. A method as claimed in claim 1 wherein the step of obtaining magnetic resonance data comprises obtaining magnetic resonance data from protons in said living body.

3. A method as claimed in claim 1 wherein the step of obtaining magnetic resonance data comprises conducting a magnetic resonance imaging pulse sequence having an image contrast which is sensitive to susceptibility changes.

4. A method as claimed in claim 1 wherein the step of providing a ferromagnetic substance comprises providing a palladium-nickel alloy as said ferromagnetic substance.

5. A method as claimed in claim 4, wherein the step of providing a palladium-nickel alloy comprises providing a palladium-nickel alloy having a nickel content of approximately of 26 at. %.

6. A method as claimed in claim 1 wherein the step of intracorporeally introducing said substance comprises implanting said substance in said living body.

7. A method as claimed in claim 1 wherein the step of intracorporeally introducing said substance comprises forming said substance into a needle and introducing said needle into said living body.

8. A method as claimed in claim 1 wherein the step of providing a ferromagnetic substance comprises providing ferromagnetic microparticles as said ferromagnetic substance, and comprising the additional step of encapsulating said ferromagnetic microparticles so as to be inert to metabolization by said living body, and wherein the step of intracorporeally introducing said substance comprises injecting a suspension of said encapsulated ferromagnetic microparticles.

* * * * *